United States Patent
Li et al.

(10) Patent No.: US 12,340,212 B2
(45) Date of Patent: Jun. 24, 2025

(54) HOTPATCH METHOD FOR VULNERABILITIES IN EMBEDDED IoT DEVICES

(71) Applicant: TSINGHUA UNIVERSITY, Beijing (CN)

(72) Inventors: Qi Li, Beijing (CN); Yi He, Beijing (CN); Ke Xu, Beijing (CN); Zhuotao Liu, Beijing (CN); Zhenhua Zou, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 209 days.

(21) Appl. No.: 18/446,227

(22) Filed: Aug. 8, 2023

(65) Prior Publication Data
US 2024/0053978 A1   Feb. 15, 2024

(30) Foreign Application Priority Data
Aug. 9, 2022   (CN) .......................... 202210948370.2

(51) Int. Cl.
*G06F 9/44* (2018.01)
*G06F 8/658* (2018.01)

(52) U.S. Cl.
CPC .................... *G06F 8/658* (2018.02)

(58) Field of Classification Search
CPC ........................................ G06F 8/658
USPC ............................................ 717/170
See application file for complete search history.

(56) References Cited

U.S. PATENT DOCUMENTS

| 2024/0095022 A1* | 3/2024 | Wei | G06F 21/14 |
| 2025/0053383 A1* | 2/2025 | Woodward, Jr. | G06F 8/30 |

* cited by examiner

*Primary Examiner* — Evral E Bodden
(74) *Attorney, Agent, or Firm* — Hodgson Russ LLP (57) ABSTRACT

The present disclosure discloses a hotpatch method for vulnerabilities in embedded Internet of Things (IoT) devices. The method includes acquiring vulnerability information of the embedded IoT devices to be patched; selecting a corresponding vulnerability patching mode based on different vulnerability types of the vulnerability information, and acquiring an eBPF patch bytecode file (first patch) and an eBPF patch code configuration file from a server according to the vulnerability patching mode; compiling the eBPF patch bytecode based on the eBPF patch bytecode and the eBPF patch code configuration file to generate a patch binary code file (second patch) and configuration information of the patch binary code; and adopting three approaches to trigger the patch binary code to patch the vulnerability information based on the configuration information and the vulnerability patching mode.

2 Claims, 6 Drawing Sheets

```
                        Vulnerbale C Code
int pico_icmp6_send_echoreply(struct pico_frame *echo) {
  // ... omit
+ if (echo->transport_len < PICO_ICMP6HDR_ECHO_REQUEST_SIZE) {
+     return -1; // invalid packet
+ }
  /*bug: When the echo->transport_len is less than the
    PICO_ICMP6HDR_ECHO_REQUEST_SIZE, the memcpy len will
    arithmetic underflow here */
  memcpy(reply->payload, echo->payload, (uint32_t)
       (echo->transport_len - PICO_ICMP6HDR_ECHO_REQUEST_SIZE));
  // ... omit
}
                        eBPF Filter Patch
#include "ebpf_helper.h"
const int PICO_ICMP6HDR_ECHO_REQUEST_SIZE = 8;

uint64_t filter(stack_frame *frame) {              Get arguments of
    uint8_t *echo = (uint8_t *)(frame->r0);        the C function
    uint16_t *transport_len_ptr = (uint16_t *)(echo + 38);
    uint16_t transport_len = (uint16_t)(*transport_len_ptr);
    uint32_t op = FILTER_PASS;
    uint32_t ret_code = 0;

if (transport_len < PICO_ICMP6HDR_ECHO_REQUEST_SIZE) {
        op = FITLER_DROP;
        ret_code = -1;
    }
    return set_return(op, ret_code);
}
```

FIG. 3

```
1 void shell_spaces_trim(char *str){          void ebpf_spaces_trim(stack_frame
2  // ...                                     *frame ) {
3  for (u16_t j = i + 1; j < len; j++) {        // ...
    // ...                                      for (u16 j = i + 1; j < len;
4     memmove(&str[i + 1],                        j++) {
5         &str[j], len - j + 1);                  // ...
+ 6   memmove(&str[i + 1],                        C_CALL(FUNC_memmove,
+ 7       &str[j], len - j + 1);                     &str[i + 1], &str[j],
    // ...                                          len - j + 1);
  }                                             // ...
  // ...                                      }
}                                             // ...
                                              }

(a). The C Source Code Patch              (b). The eBPF Code Replace Patch
```

FIG. 4

```
patch_type: # filter_patch | code_replace_patch
trigger_point:
  function_position: # e.g., shell_spaces_trim
  statement_position: # optional
                      # e.g., addr = n * BLOCK_SIZE;

trigger_type: # FPB | KPROBE | FIXED run_type: # JIT | INTERPRET variable_map:
  - MARCO_A:
    address_type:  # function_name | global_variable
    match_name: # e.g., func_a
  - MARCO_B:
    # ...
```

| | Patch Point Granularity | Support Device | # of Patch |
|---|---|---|---|
| Manually Insert | Function Begin | All | 32+ |
| FPB | Basic Block | Only Cortex-m3/m4 | 6 |
| Debug Monitor | Basic Block | Cortex-m3~m55(all), RISCV | 8 |

HOTPATCH METHOD FOR VULNERABILITIES IN EMBEDDED IoT DEVICES

CROSS-REFERENCE TO RELATED APPLICATION

This application claims priority to Chinese Patent Application No. 202210948370.2, filed on Aug. 9, 2022, the entire disclosure of which is incorporated herein by reference.

FIELD

The present disclosure relates to the patching for vulnerabilities in Internet of Things (IoT) devices, in particular to a hotpatch method for firmware vulnerabilities in embedded Internet of Things (IoT) devices.

BACKGROUND

Embedded Internet of Things (IoT) devices equipped with sensors are an important part of an IoT ecosystem, which realizes network connections between devices and the real world. Since such devices usually have limited computing resources, they are also referred to as resource-constraint IoT devices or embedded IoT devices. Most of the operating systems used by the embedded IoT devices belong to real-time operating systems (RTOSes). However, the current real-time operating systems need to provide various services which may lack security considerations. As a result, there are a large number of vulnerabilities in these systems such as the kernel or network stacks. To avoid these devices being exploited by attackers, it is necessary to mitigate these vulnerabilities by patching and updating the firmware of the IoT devices.

SUMMARY

On the one hand, the present disclosure provides a hotpatch method for vulnerabilities in embedded Internet of Things (IoT) devices without rebooting a system. This method includes acquiring vulnerability information of the embedded IoT devices to be patched; selecting a corresponding vulnerability patching mode based on different vulnerability types of the vulnerability information, and acquiring an eBPF bytecode code patch and a patch configuration file from a server according to the vulnerability patching mode; compiling the eBPF bytecode code patch (i.e., a first patch) based on the patch configuration file to generate a binary patch code (i.e., a second patch) and a patch deployment configuration file; and executing different instructions on a second patch code to patch the vulnerability information based on the configuration information and two vulnerability patching mode. The two vulnerability patching mode include a filter patch mode and a code replace patch mode. The filter patch mode runs a vulnerability function on the second patch code to check whether the parameters are legal, then returns from the patch code and continues the vulnerability function in case that the parameters are legal and do not trigger a buggy code. The code replace patch mode replaces the vulnerability function or a code segment by the second patch code. To deploy the patch, users can set the patch mode along with the patch configuration. Note that devices with different firmware and architectures can share a same first patch code in case that they have the same vulnerability as these devices can generate their own (device-specific) second patch code based on the first patch code. After a device receives the first patch code and the patch configuration from the server, it then compiles the first patch code via JIT (just in time compiling) to generate the device-specific binary code (i.e., the second patch) and performs corresponding operations according to different operation codes (e.g., return or replace) when the second patch code is executed. The second patch can either prevent the execution of the vulnerable function by directly returning an error code to its caller, or replace the vulnerable function (or the code segment) with the correct binary code which has equal functionalities with an original vulnerable C code.

To trigger the second patch on vulnerable devices, the present disclosure introduces three approaches to redirect a control flow from the vulnerable code to the patch code. The first approach is to place fixed checkers at the beginning of each function during firmware compilation, and the checker can invoke the patch before the origin function is called in case that it finds that there is a patch installed at that function. The first approach is to place fixed checkers at the beginning of each function during firmware compilation, and the checker can invoke the patch before the origin function is called in case that it finds that there is a patch installed at that function. The second approach is to use the MCU features of Cortex-m3/m4 which use a REMAP table to redirect the control flow from nay function to the patch code. The last approach is to use CPU/MCU's hardware breakpoints which can invoke a custom exception handler to execute the patch code at any function address. By combining the three approaches, the patches can be triggered in various IoT hardware.

Additional aspects and advantages of the present disclosure will be set forth, in part, in the following description, and in part will be apparent from the following description, or learned by practice of the present disclosure.

BRIEF DESCRIPTION OF THE DRAWINGS

The above-mentioned and/or additional aspects and advantages of the present disclosure will be apparent and readily understood from the following description of embodiments taken in conjunction with the accompanying drawings.

DETAILED DESCRIPTION

It is to be noted that embodiments in the present disclosure and features in the embodiments may be combined with each other without conflict. The present disclosure will be described in detail below with reference to the accompanying drawings and in connection with the embodiments.

In order to enable those skilled in the art to better understand the solutions of the present disclosure, the technical solutions in embodiments of the present disclosure will be clearly and completely described below with reference to accompanying drawings in the embodiments of the present disclosure. Obviously, the described embodiments are only part of the embodiments of the present disclosure, but not all of the embodiments. Based on the embodiments in the present disclosure, all other embodiments obtained by those skilled in the art without creative labor shall fall within the protection scope of the present disclosure.

At present, mainstream firmware updating and patching methods for the embedded IoT devices may be divided into two categories. The first category is that manufacturers of the IoT devices release a new firmware after patching vulnerabilities, and device users download the new firmware, and manually erase a device flash and rewrite the firmware. This way requires users of the IoT devices to have professional knowledge and the ability to manually update the firmware. The second category is to enable the IoT devices to be networked, and automatically update an online firmware by means of on-the-air (OTA). Before releasing an OTA update, the manufacturers of the IoT devices may need to synchronize and adapt an update of an open source real-time operating system or a third-party software library, and also need to be fully tested for different devices, so the update of the OTA cannot be released frequently, which may easily lead to additional attack windows. At the same time, both methods need to suspend the service of the IoT devices and restart the devices to complete the update and patch. To sum up, the firmware of the embedded IoT devices currently lacks an effective vulnerability patch means that may be deployed quickly and without interrupting device services.

A hotpatch technology is a patch technology that keeps a software working normally during an update process. This patch technology has been widely used in traditional software fields such as Linux servers, without interrupting a software service or restarting a system. Recently, there are a small number of studies applying the hotpatch technology to the fields of Android and the embedded IoT devices. The existing mainstream hotpatch strategies may be divided into the following four categories.

(1) Code instrumentation. The code instrumentation requires rewriting an executable memory. In this way, the modification, deletion or replacement of an original vulnerability code segment is effectively realized. The difficulty of this solution is that in response to determining that an original CPU just executes a vulnerability code segment in a process of rewriting the executable memory, a program is easy to enter an inconsistent state at this time, resulting in more serious running errors and losing the meaning of hotpatch. Therefore, a most common strategy at present is to replace an entry instruction of the vulnerability code segment with a jump instruction or a branch instruction, so as to jump to a vulnerability patch flow, and rewriting a single instruction itself ensures the atomicity of the patch process. However, executable programs of the embedded IoT devices are usually stored in a flash, which does not support erasing and writing at the granularity of instructions.

(2) A/B system. Also referred to as an incremental update technology, it means that the official releases an upgrade patch to a device through an OTA and other forms. The device uses the patch and an old system image to construct a new system image in a background, so that the old system may keep working normally during the construction process. After the construction is completed, select an appropriate time point to switch from the old system to the new system. This mode is adopted in an OTA update of Android. The A/B system is not really a hotpatch, since the device still needs to stop working in the process of switching from the old system to the new system, resulting in non-working hours. In addition, a system of keeping two versions in a memory at the same time will also cause a greater device storage pressure, which is not feasible for embedded IoT devices with limited storage resources.

(3) Relocatable executable files. This way needs modifying a binary link structure of the executable files and relies on dynamic linking. A dynamic link library refers to a code that is not included in a compilation and linking process of the executable files, but is dynamically loaded and symbol parsed according to requirements at runtime. In many modern operating systems such as Linux and Windows, since a large number of libraries may be shared by multiple applications, and there is no strict time limit for application execution, a dynamic linking technology is widely used to save system storage space. In response to determining that a bottom layer of the operating system supports dynamic linking, it is intuitive to use dynamic linking to realize a hotpatch. It merely needs to modify a symbolic linking at runtime, so any dynamically linked system component may be replaced at runtime to complete a component update or a vulnerability patch. However, the dynamic linking technology will bring additional system runtime overhead and burden, and will also destroy the time limit of the real-time operating system and the controllability of task response delays. Therefore, a mainstream linking mode of the real-time operating system currently adopted by the embedded IoT devices is still static linking. Therefore, a hotpatch technology implemented by the locatable executable files is less feasible in a firmware patch scenario of IoT devices.

(4) Hotpatch technology based on hardware characteristics. In the case that an executable memory cannot be modified, a small number of hotpatch researchers have turned their attention to the hardware facilities of a CPU itself. Relying on hardware breakpoints of the CPU, a program execution flow may be intercepted at a specified address to achieve an interception effect similar to that of rewriting a single instruction. This way is the most suitable hotpatch technology for the vulnerabilities in embedded IoT devices. Existing work has proposed a corresponding hotpatch solution based on the characteristics of an ARM platform and the hardware breakpoints. However, at present, there is no hotpatch solution based on hardware characteristics that is suitable for the real-time operating system on the embedded IoT devices.

An extended Berkeley packet filter (eBPF) is a universal execution machine in a Linux kernel, which has characteristics of low overhead and supports system checking and a kernel expansion. It is now being increasingly applied to operating system security issues in different scenarios, such as performance analysis, network acceleration, and development of security intrusion detection systems. This powerful expansion enables the eBPF to be used to implement a hotpatch of the embedded IoT devices based on the hardware characteristics. However, since an eBPF program comes from user space but executes in a kernel, it has too strict memory access limitations and loop prohibition, which seriously limits its vulnerability patch ability. At present, there is no a safe, easy-to-use and compatible system, which may be used for a hotpatch of embedded IoT devices with high real-time requirements.

The present disclosure is intended to solve at least one of the technical problems in the related art to some extent.

Therefore, the present disclosure provides a hotpatch method suitable for vulnerabilities in embedded Internet of Things (IoT) devices, aiming at security problems existing in the above-mentioned embedded IoT devices, and making up for deficiencies of existing vulnerability patch technologies. The firmware vulnerability patching work may be automatically and rapidly completed under the condition that a software service is not interrupted or a system is restarted, and the method is suitable for real-time operating systems of various IoT devices, and the overhead is small.

A hotpatch method for vulnerabilities in embedded Internet of Things (IoT) devices and a hotpatch apparatus for vulnerabilities in embedded IoT devices according to embodiments of the present disclosure will be described below with reference to the accompanying drawings.

Figure 1:
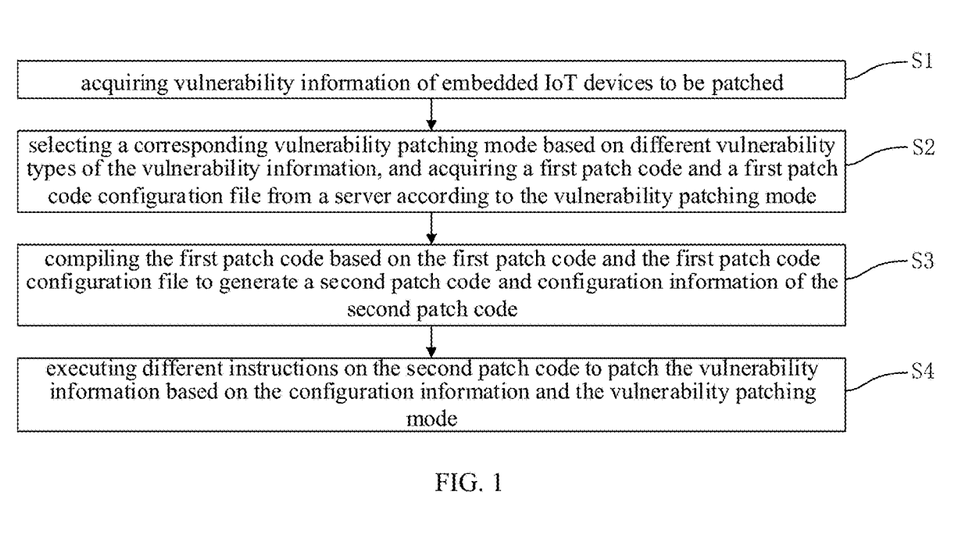
FIG. 1 is a flow chart of a hotpatch method for vulnerabilities in embedded Internet of Things (IoT) devices according to an embodiment of the present disclosure.

FIG. 1 is a flow chart of a hotpatch method for vulnerabilities in embedded Internet of Things (IoT) devices according to an embodiment of the present disclosure.

As shown in FIG. 1, the method includes, but is not limited to steps as follows.

In S1, vulnerability information of the embedded IoT devices to be patched is acquired.

In S2, a corresponding vulnerability patching mode is selected based on different vulnerability types of the vulnerability information, and a first patch code and a first patch code configuration file are acquired from a server according to the vulnerability patching mode.

It is reasonable that a vulnerability report of a firmware is acquired, and the vulnerability information is patched.

The embodiment of the present disclosure provides two basic ideas for patching vulnerabilities. One idea is to intercept the execution of a program at an entrance of a vulnerability function or a key code point triggered by the vulnerability, and filter out a harmful input that may trigger the vulnerability. The other idea is to directly replace functions or code segments with basic block granularity. The two patch ideas correspond to a filter patch mode and code replace patch mode, respectively. Patch codes in the two patch modes are also different. A developer needs to first select the patch mode according to vulnerability patch requirements, and then compile a corresponding eBPF patch code and a patch code configuration file according to a selected vulnerability patching mode, so as to assist a toolchain of the present disclosure to complete the automatic adaptation and compilation, a verification check, and a final installation configuration of an eBPF code. In response to determining that access to global variables is involved in the patch code, the developer does not need to care about an address of the global variable in a specific firmware, just replace the global variable with a macro in a specific format, and record a corresponding correspondence between the macro and a global variable name in the patch code configuration file. The repair mode also needs to be indicated in an eBPF code configuration file, so that different limitations may be adopted when an eBPF VM executes the patch code.

Figure 2:
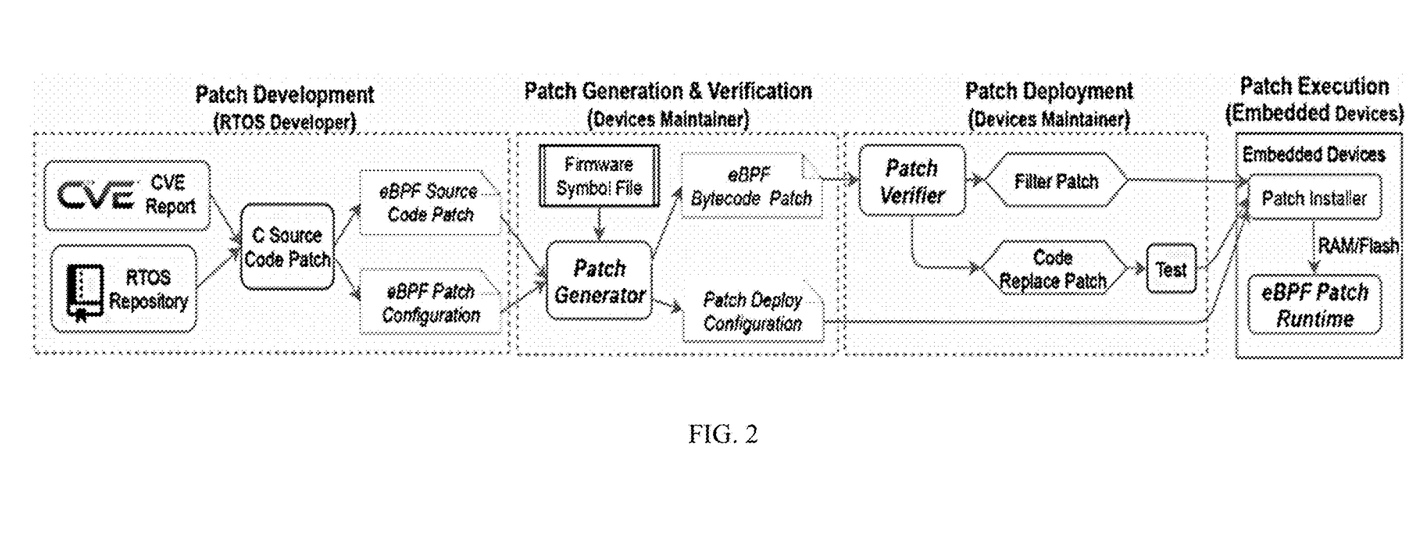
FIG. 2 is a schematic diagram of an architecture of a hotpatch for vulnerabilities in embedded Internet of Things (IoT) devices according to an embodiment of the present disclosure.

It is reasonable that the development of eBPF patch code is based on details of a latest vulnerability report and a vulnerability software code acquired by a device manufacturer. Considering that the execution capabilities of the vulnerability code required for patching different vulnerabilities are different, the present disclosure designs two different patch modes, namely, a filter patch mode and a code replace patch mode. The developers may select a corresponding patch mode to compile the patch code according to actual vulnerability patch requirements. In addition to the patch code, the developer also needs to compile a corresponding configuration file for the patch code for use in the compilation and verification stage of the patch code. An architecture of the present disclosure is shown in FIG. 2.

(1) Filter Patch Mode

It is reasonable that most of firmware vulnerabilities in the embedded IoT devices are caused by function's lack of legality checks for some of parameters passed in, thus may leading to problems such as a program buffer overflow, a memory error, an infinite loop. The filter patch mode is used to patch this type of vulnerability. It merely needs to intercept a flow of the execution of the program at the entrance of a function or an entrance of a vulnerability code segment, redirect it to the patch code, parse a value of an acquired target parameter in the patch code, and further filter an illegal input. Specifically, it is to check whether the parameters are legal in the patch code. In response to determining that the parameters are legal, the patch code is exited and it is continued to execute the vulnerability function. In response to determining that the parameters are illegal, the execution of the vulnerability function is ended in advance by directly returning an error code to a caller or jumping to an error processing flow in the vulnerability function.

Figure 3:
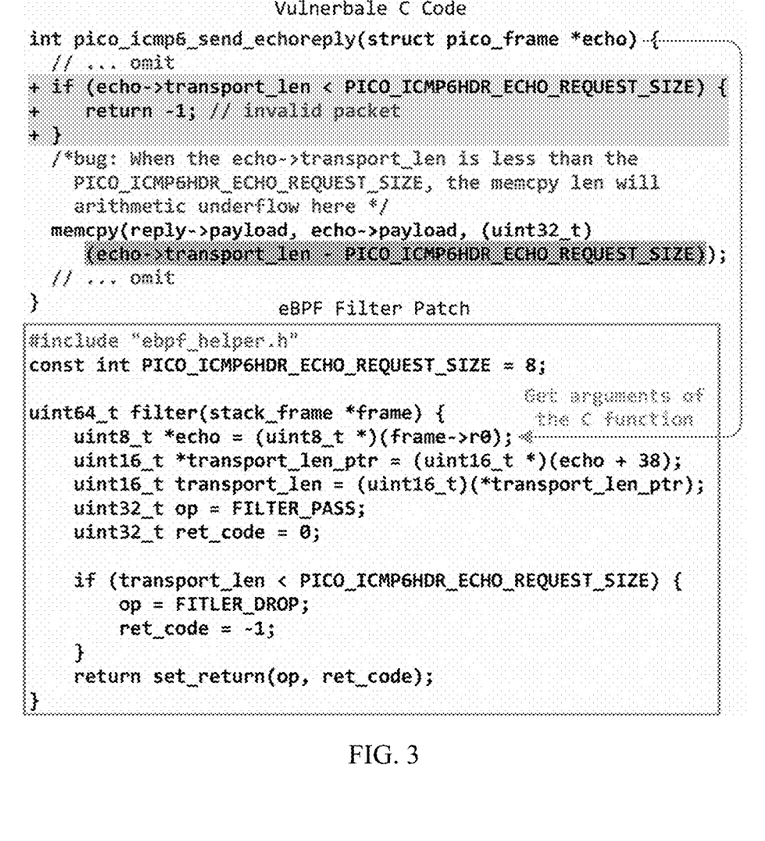
FIG. 3 is a schematic diagram of generating a patch code by using a filter patch mode according to an embodiment of the present disclosure, including a vulnerability code of CVE-2020-17443 and an eBPF filter patch.

Specifically, take a vulnerability in CVE-2020-17443 from a PicoTCP protocol stack disclosed in a vulnerability report of AMNESIA33 as an example. As shown in FIG. 3, a "Vulnerable C Code" part in FIG. 3 shows that the root cause of the vulnerability in CVE-2020-17443 is that a pico_icmp6_send_echoreply function of the PicoTCP protocol stack does not determine whether a length of ICMPv6 header of a request packet is legal when processing an ICMPv6 echo request. That is, whether a size of an echo→transport_len variable is greater than or equal to 8 is not checked in the code, so an integer underflow may occur at an operation marked by a shadow in line 10 of the Vulnerable C Code in FIG. 3, resulting in a memory error through a memcpy function. The content and size of ICMPv6 echo request packet are completely controlled by network input, so it is easy for an attacker to construct an illegal ICMPv6 echo request to realize the purpose of attack. An official patch code is a part of the code marked by shadows in lines 3 to 5 in FIG. 3, that is, a corresponding field check is added in the function.

The eBPF filter patch code compiled for the CVE-2020-17443 in the present disclosure is shown in an "eBPF filter patch" part in FIG. 3. A parameter frame of a filter function is state information of a CPU register when context switching is pre-prepared for interception (that is, just before entering a vulnerability function and executing a first instruction). Combined with a structure definition in the vulnerability code, a value of a transport_len variable may be acquired through pointer arithmetic in the filter function, and then it may be checked whether the value is legal, that is, whether the above-mentioned vulnerability may be triggered. In response to determining that malicious input that triggers a vulnerability is detected, the eBPF filter patch will return an error operation code and an optional return address. In the filter patch mode, the execution logic of the patch code merely involves reading the memory outside the eBPF stack. Therefore, the patch code to the kernel memory outside the eBPF stack may be compiled or a local C function may be called in a runtime module for a filter patch to restore prohibited code. In addition, the return value of the patch code will be strictly limited to three operation codes, namely, OP_PASS, OP_REDIRECT and OP_DROP. The OP_PASS indicates that the input is legal, and the vulnerability will not be triggered. The OP_REDIRECT and OP_DROP both indicate that the input is illegal, and it is necessary to jump to an error processing flow in a function or a caller function. After the patch code is executed, a patch loader module in the runtime module will receive one of these three operation codes and then perform different processing.

The above-mentioned limitations on the patch code in the filter patch mode ensure the security of the filter patch code, so the filter patch code does not need additional patch code testing, thus accelerating the deployment and dissemination of the patch code. The above-mentioned limitations may be guaranteed by an offline verifier and an eBPF VM runtime dynamic check provided by the present disclosure.

(2) Code Replace Patch Mode

Figure 4:
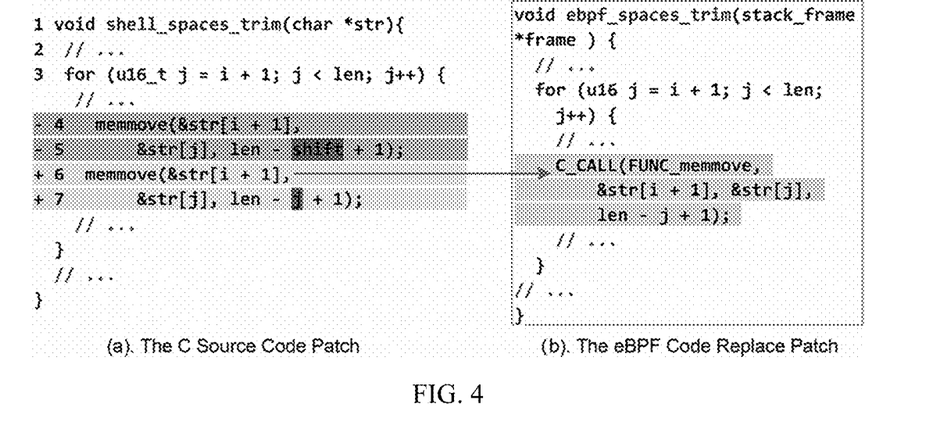
FIG. 4 is a schematic diagram of generating a patch code by using a code replace patch mode according to an embodiment of the present disclosure, including a vulnerability code of CVE-2020-10023 and an eBPF function replace patch.

Some vulnerabilities in the firmware of embedded IoT devices cannot be patched by adding parameter checks at the entrance of the vulnerability function. A typical example is CVE-2020-10023 from Zephyr OS. Details of the vulnerability code point of the CVE-2020-10023 are shown on the left side of FIG. 4. The root cause of this vulnerability is that a third parameter is passed incorrectly (j is passed as shift) when a shell spaces trim function of a shell sub-system of Zephyr OS calls a memmove function, so even a legal shell input may cause a buffer overflow. In the present disclosure, similar vulnerabilities that are not related to a function input are attributed to logical bugs. Such vulnerabilities originate from errors in calling logics in functions or between functions. It is impossible to prevent vulnerability exploitation by filtering harmful inputs. The only solution is to replace the vulnerability functions or specific code segments.

In addition, the patch of some vulnerabilities needs to call a local C function of the firmware to acquire key information. Taking the well-known key negotiation downgrade attack in a Bluetooth protocol stack, and a key negotiation of Bluetooth (KNOB, CVE-2019-9506) vulnerability as an example, a Bluetooth connection with too small key length must be detected in a process of the patch, and the underlying HCl API, that is, the local C function, must be called to acquire the Bluetooth key length.

The code replace patch mode is used to patch some special vulnerabilities reflected in the above-mentioned two examples. Two important functional requirements of the patch code of such vulnerabilities are as follows. One is to replace the original function or vulnerability code segment, and the other is to call the local C function to acquire information. To replace the original vulnerability function or code segment, it is necessary to give the patch code the same execution capability as a local code, including C function calls and kernel memory compilations outside the eBPF stack. Continue to take the CVE-2020-10023 as an example to illustrate a patch code format in the code replace patch mode. As shown on the right of FIG. 4, the code replace patch mode uses an eBPF spaces trim function to replace an original vulnerability function shell spaces trim in the patch code. Since the eBPF is a C-like language, the code replace patch actually copied the original vulnerability function almost completely, but merely modified a parameter parsing logic, and replaced the function call part with a helper function. It may be seen that the development of patch code in code replace patch mode is very simple and intuitive. According to the present disclosure, a simple foreign function interface (FFI) is realized in a form of the helper function in a subsequent runtime module, thus supporting calling the local C function in the eBPF code.

Figure 5:
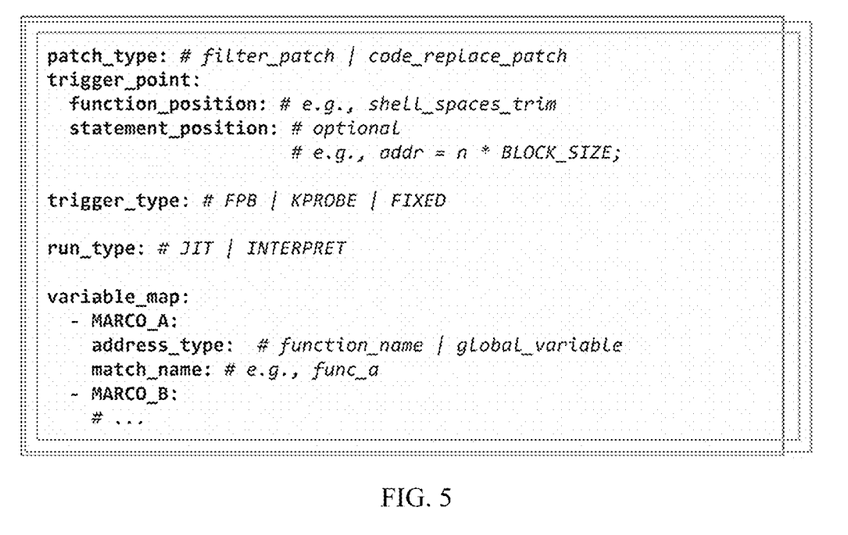
FIG. 5 is a schematic diagram of a format of a patch code configuration file according to an embodiment of the present disclosure.

Further, the developer of the patch code does not need to care about specific firmware information when compiling the patch code. For global variable names and firmware function names involved in the patch code, a macro with a specific format may be used to replace them. A macro correspondence between the global variable names and firmware function names is recorded in the patch code configuration file. The present disclosure uses YAML to compile the patch code configuration file, and a format of the patch code configuration file is shown in FIG. 5. A patch type specifies the patch mode. A trigger_point declares an interception site. A function_position is a name of an intercepted target function, and a statement_position is used as an option to index an entrance of a target basic block. A run type is an operation mode of the patch code. A variable map gives a corresponding correspondence between the macro involved in the patch code and the global variable name or the function name.

In S3, the first patch code is compiled based on the first patch code and the first patch code configuration file to generate a second patch code and configuration information of the second patch code.

It is reasonable that the compilation and verification of the patch code is completed by a toolchain module in the present disclosure. A developer of a device manufacturer uses the toolchain of the present disclosure to automatically adapt, compile and verify patch codes for specific firmware with vulnerabilities. Real-time operating systems with vulnerabilities or a range of versions of software libraries are recorded in an eBPF configuration file. In response to determining that the device manufacturer has a good record of the real-time operating system and the software library version included in a specific firmware, compilation parameters and configuration used, it may directly determine whether the firmware contains corresponding vulnerabilities. In response to determining that the above-mentioned information of a small amount of firmware is lost, the present disclosure also provides a binary file function comparison tool in the toolchain to assist in determining whether the target vulnerability function is included in a firmware. For a specific firmware with vulnerabilities (a specific version and a specific compilation configuration for specific devices), the toolchain needs its symbol table information to locate a function address, and automatically completes the address replacement of global symbols when compiling the patch code. After the patch code is automatically compiled, a binary eBPF patch code and deployment configuration information of the patch code will be generated. The configuration information includes an address of a target vulnerability function, a size of the patch code, a patch mode, an execution mode and a trigger mode. In addition, a customized verifier in the toolchain will check offline whether the binary eBPF patch code has behaviors that may introduce security risks, such as a memory compilation outside the eBPF stack, a loop, and a function call. In response to determining that the binary eBPF patch code has behaviors that introduce security risks, it will give a specific prompt to the developer, and the developer needs to further test the patch code according to the prompt to ensure its security.

Specifically, two core components of the toolchain are a patch generator and a patch verifier, namely, a generator and a verifier of the binary eBPF patch code. The patch generator combines a firmware-independent patch code compiled by users with symbol information of the specific firmware to compile and generate a binary eBPF patch code that may be deployed on a device to run. The patch verifier performs a security check on the binary eBPF patch code before deployment.

As an example, the patch code is compiled (the patch generator). Since the firmware of embedded IoT devices usually adopts static links when compiling, same functions and variables in the firmware of different compilation configurations generally have different addresses. According to the present disclosure, the developer of the patch code does not need to care about specific firmware information on a specific device. In detail, when using eBPF to compile patch code, the developer may use macros to replace addresses of global variables or function addresses, and record a corresponding correspondence between macros and global symbol names in a configuration file of eBPF patch code. Before compiling the patch code, the patch generator will query a symbol table of the vulnerability firmware accordingly, replace a corresponding global variable name or a function name with the global address, and then compile the eBPF patch code. In addition, when querying the symbol table of the vulnerability firmware, the patch generator will also find an entry address of the vulnerability code segment according to the vulnerability function name and a basic block label in the eBPF code configuration file, and record it in patch code deployment configuration information, which is subsequent used by a patch installer to install and enable the patch code.

As an example, the patch code is verified (the patch verifier), the binary eBPF patch code generated by the patch generator may be safely checked by the patch verifier. The verifier may identify unsafe behaviors in the patch code, namely, loops, memory accesses outside the stack and C function calls. The patch code without the above-mentioned unsafe behaviors may be deployed directly in filter patch mode without subsequent testing. Otherwise, the patch verifier will mark corresponding unsafe instructions through automatic instruction analysis to help the developer perform further inspection and testing before deploying it to devices. The developer may use the patch verifier to ensure the security of the patch code of the filter patch, thus skipping the subsequent testing and completing the deployment directly.

Since an eBPF verifier provided in the Linux kernel performs too strict loop limitations and memory access range limitations, it cannot meet actual vulnerability patch requirements, and cannot be directly used in the architecture of the present disclosure. In addition, a loop tolerated by the eBPF verifier in the Linux kernel must be a predictably terminating loop. However, even in a patch mode of the filter patch, filtering malicious input may also need reading of global variables or loops controlled by input parameters, which are prohibited in the eBPF verifier of Linux kernel. At the same time, when installing the filter code, the eBPF verifier of the Linux kernel performs checks to ensure that an eBPF program that does not meet the requirements cannot be executed in the system at all, but this is not feasible for embedded IoT devices with limited computing power. Verification of the patch code on a device wastes excessive device resources. Therefore, the present disclosure changes ideas, realizes an offline eBPF verifier—patch verifier before deploying the patch code, and merely provides a verification result to the developer for reference. It is up to the developer to decide whether to deploy the patch code. There are two main differences between the patch verifier and the eBPF verifier in the Linux system. Firstly, in the filter patch mode, merely the eBPF code is allowed to compile to the memory in the stack corresponding to an eBPF program, but a range of memory space readable by the eBPF code is not limited. The eBPF verifier in the Linux system merely allows the eBPF program to read and compile a specific packet buffer. Secondly, the eBPF verifier in the Linux system will perform loop unrolling to ensure that the loop of eBPF program may end, and the patch verifier merely detects whether there is a loop and prompts the developer.

Figure 6:
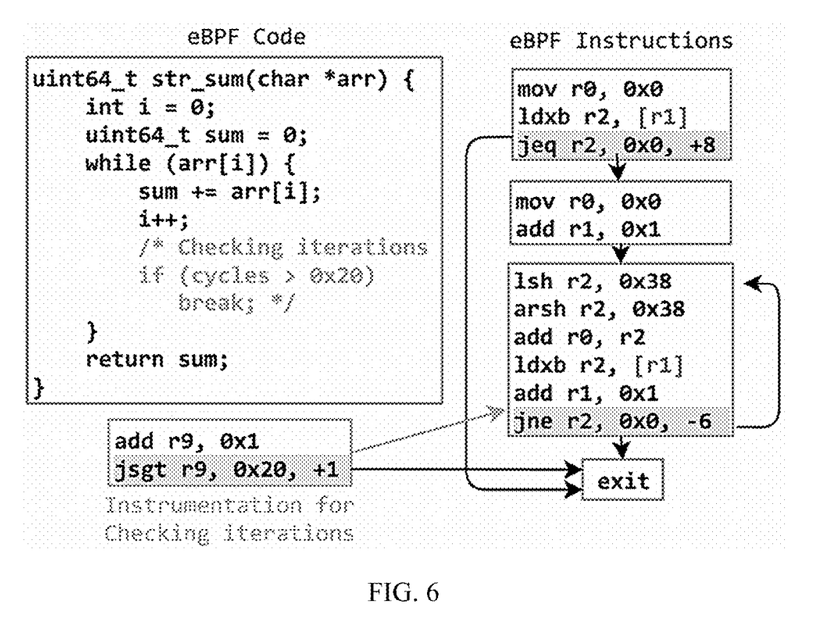
FIG. 6 is a schematic diagram of describing a verification of a patch code and performing a loop check instrumentation by using an eBPF JIT according to an embodiment of the present disclosure.

It is reasonable that even a most advanced eBPF verifier cannot accurately determine whether a loop may be terminated. Since loop conditions may depend on input data, static analysis method is not feasible. Therefore, the present disclosure chooses to prevent the program from falling into an infinite loop when the eBPF binary code is executed in the eBPF VM. In an interpretation execution mode, for each jump instruction executed, the architecture of the present disclosure will check its jump offset. In response to determining that the offset is negative, it means that it will transfer to a previous basic block, which may form a loop. At the same time, a global counter is used to record the number of times through such instructions, and the number of jumps is limited. For JIT execution, the architecture of the present disclosure will implant a checkpoint into the loop during JIT compilation. As shown in FIG. 6, the limitation on the number of loops is completed. The above-mentioned two loop limitation methods ensure that a target vulnerability application will not enter an infinite loop due to the activation of the patch code generated in the present disclosure, thus destroying the real-time limitation of the task.

In S4, different instructions is executed on the second patch code to patch the vulnerability information based on the configuration information and the vulnerability patching mode.

It is reasonable that the deployment and operation of the patch code is completed by the runtime module in the present disclosure. After the verification of the patch code is completed, the device manufacturer may complete the transmission of the patch code through an encrypted network communication or a secure external interface of the device. For real-time operating systems that already support secure OTA updates, the developer may continue to use an original OTA network communication channel to transmit patch codes. In order not to affect high-priority transactions that need high real-time, a thread that receives and installs the enabling patch code on the device runs in a lower priority. The patch installer stores received patch codes in the patch list, records a patch mode and an execution mode of each patch code, and finally enables different patch code triggering modes according to received patch code deployment configuration information. The runtime module of the present disclosure simultaneously supports a fixed patch code trigger point and a dynamic patch code trigger point. The fixed patch code trigger point is a software hook point, and the dynamic patch code trigger point is supported by a hardware breakpoints, including a flash patch point (FPB) trigger and a debug monitor trigger. It is to be noted that in an ARM Cortex-M4 scenario that has been implemented, merely one of the FPB trigger mode and the debug monitor trigger mode may be enabled at the same time, depending on different CPU configurations. The patch code trigger point is a patch trigger module in runtime, which is configured to intercept the vulnerability function. After a vulnerability function call is intercepted, a patch loader finds a corresponding patch code, and performs the patch code differently according to a corresponding execution mode and an execution mode recorded by the patch installer. In filter patch mode, modifying memory outside the eBPF stack and calling C functions in the patch code are completely disabled by the patch loader. An interpretation execution is checked when the patch code is running, and a JIT execution completes the check when JIT is compiled, and the patch code that does not meet the requirements is directly discarded.

Figure 7:
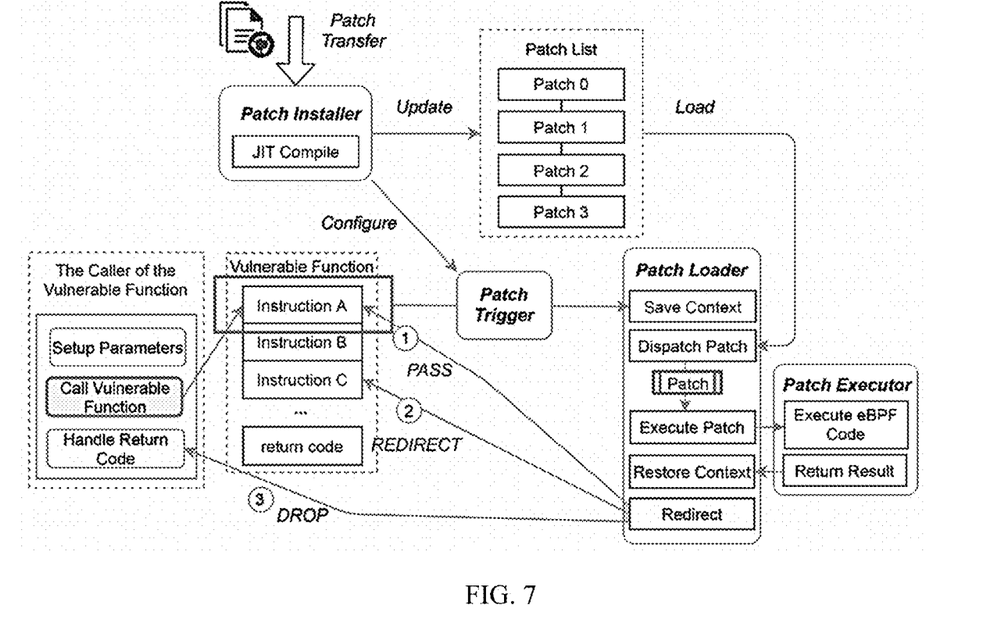
FIG. 7 is a schematic diagram of an architecture and a workflow describing a deployment and an operation of a patch code by a runtime module according to an embodiment of the present disclosure.

Specifically, the runtime module in the present disclosure is a static software library that needs to be integrated into the firmware when compiling and is responsible for completing the installation and execution of the patch code when the firmware is running. The runtime includes four core components: a patch installer is responsible for installing and enabling the patch code, a patch trigger is responsible for triggering an execution process of the patch code, a patch loader is responsible for switching the context of program execution and loading of the patch code, and a patch executor (eBPF VM) is called by the patch loader to complete the execution of the patch code. The architecture and workflow of the runtime are shown in FIG. 7, and the design and function of each component of the runtime will be introduced in detail as follows.

Further, the path code is installed (the patch installer). The present disclosure completes the reception of the patch code through an encrypted network transmission or other reliable external interfaces of the device, and then uses the patch installer to complete the installation of the patch code. The patch installer appends a received patch to a global patch list according to patch interception addresses recorded in patch code deployment information. The global patch list is sorted in ascending order based on the interception addresses of each patch. An execution mode and a patch mode of each patch code are also recorded in the patch list. When the patch loader loads and executes the patch code later, it will first perform a binary search in the patch list according to the interception address, and perform a corresponding processing according to the patch mode and execution mode recorded in the patch list.

The patch installer also needs to perform concurrency with the patch loader. In the architecture of the present disclosure, a read copy update (RCU) mechanism is used to ensure that the patch loader does not need to wait when loading and executing the patch code. A specific implementation is to complete the update of the patch list in a separate thread task. The thread will copy the global patch list to obtain a temporary patch list, then update the temporary patch list, and then synchronize it to the global patch list through a compare and swap (CAS) atomic operation. During this period, the patch loader may continue to access the global patch list.

After the patch installer stores the patch codes and related information in the patch list, for the patch code triggered based on the hardware breakpoints, the hardware breakpoints need to be configured to enable the patch code, which will be introduced in detail in the next section. For the patch code that needs JIT execution, the patch installer is also responsible for JIT compilation, translating the binary eBPF patch code into a local machine code.

Figure 8:
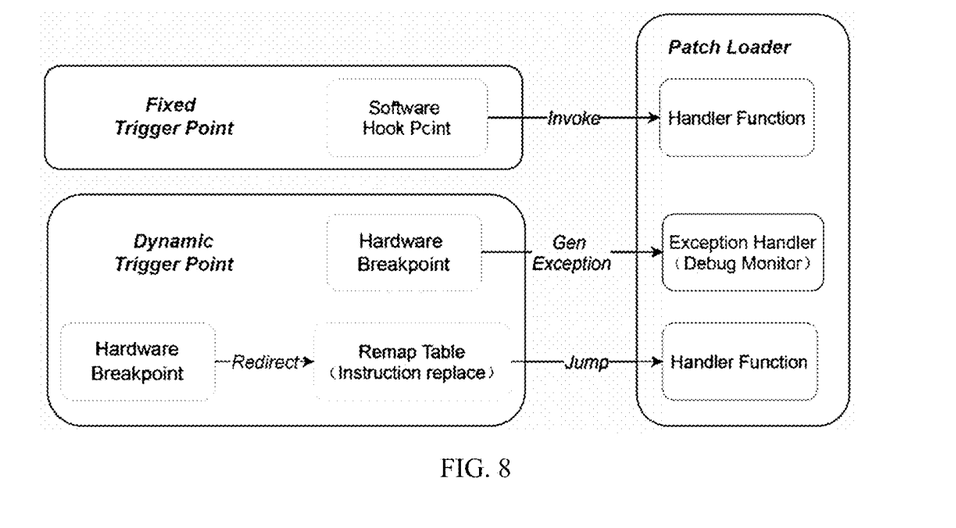
FIG. 8 is a schematic diagram of describing principles of three patch code triggering modes of a patch trigger according to an embodiment of the present disclosure.

Further, the patch code is triggered (the patch trigger). The patch trigger intercepts an execution flow of the vulnerability function, and redirects the execution flow to the patch code through the patch loader. In general, two types of patch code trigger modes are supported, one is the fixed patch code trigger point, and the other is the dynamic patch code trigger point. The fixed trigger point includes a software triggering mode, and the dynamic trigger point includes two hardware triggering modes. The three trigger modes are shown in FIG. 8.

The fixed patch code trigger point is similar to a hook point implanted by Linux security modules (LSMs) in the Linux system, and a flow of the function is intercepted by inserting a stake at an entrance of the function. In the architecture of the present disclosure, the hook point at the entrance of the function may be manually added by the device manufacturer when developing the firmware, or the developer may provide a list of key functions that need to insert a stake, and automatically insert the stake in a firmware compilation stage through tools supported by the toolchain module. As shown in FIG. 8, after the software hook point is successfully intercepted, it will enter a corresponding processing function, and try to call the patch loader to execute the patch code in a processing function. In response to determining that the patch loader does not query a corresponding patch code, it will return to an original function to continue execution, otherwise it will execute the patch code. Due to the fact that most of the network protocol stack vulnerabilities disclosed in FreeRTOS and Ripple 20 are located in different layers of the network protocol stack, the reason for this is the lack of legality check on function input. The fixed patch code trigger point combines with the patch mode of filter patch may easily filter out illegal access, thus avoiding the vulnerability from being triggered and strictly ensuring the security of the patch code.

The dynamic patch code trigger point intercepts a flow of the function based on a hardware breakpoints supported by a device CPU. Since an address that may be compiled in a hardware debugging register is arbitrary, an interception address of the dynamic patch code trigger point is arbitrary. As shown in FIG. 8, the present disclosure currently supports two hardware triggering modes on an ARM Cortex-M4 platform. One mode is flash patch point (FPB) trigger. In this mode, an address is remapped after the address in a hardware debugging register is matched, an instruction is replaced through a REMAP Table, a target instruction is replaced with a jump instruction, and jump to a corresponding processing function in the patch loader. The other hardware triggering mode also needs to use the hardware debugging register. The difference is that an instruction is not replaced after the address in the hardware debugging register is matched, and a hardware exception is triggered. The exception is handled by the debug monitor in the patch loader, a state of a CPU register at a time of interruption is pushed, and then the patch code is executed. Since both hardware triggering modes need the support of hardware debugging registers, and a CPU configuration merely supports simultaneous enabling of one of the two debugging registers modes of operation, merely one of the two hardware triggering modes may be selected on a same device. The enabling of hardware debugging register and the configuration of working mode are completed by the patch installer. In addition, the FPB mode is merely supported on the ARM Cortex-M3/M4 platform, and a hardware interrupt exception handling process similar to the debug monitor is adopted by most mainstream CPUs, so the second hardware triggering mode is more universal.

Figure 9:
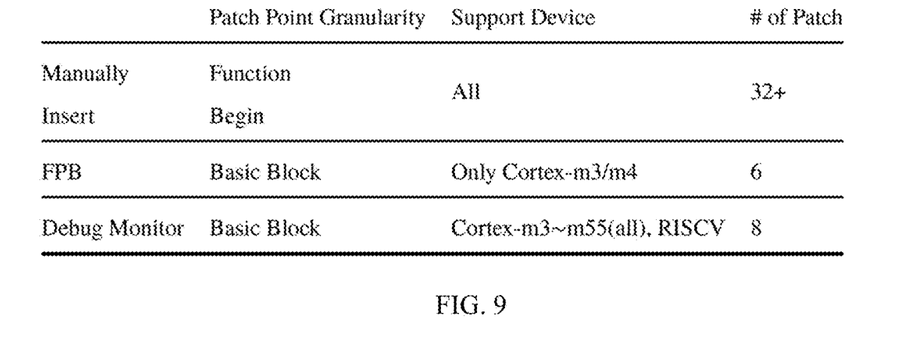
FIG. 9 is a comparative schematic diagram of describing three patch code triggering modes of a patch trigger according to an embodiment of the present disclosure.

Each of the three patch code triggering modes has its own advantages and disadvantages, as shown in FIG. 9 for a detailed comparison. A fixed trigger point implemented by software is inserted when the firmware is compiled. The interception point is usually located at the entrance of the function and cannot be modified during the running of the firmware. The dynamic trigger point supported by hardware may be enabled and canceled when the firmware is running, and its interception point is arbitrary. In terms of the number of patch codes that may be installed at the same time, the software triggering is merely limited by the memory size of the device, and the hardware triggering is mainly limited by the number of hardware debugging registers on the CPU. For example, a range of this number on the ARM platform is 6 to 8. The software triggering may be applied on any processor platform, and the two hardware triggering modes have different degrees of hardware dependence. Without installing the patch code, the two hardware triggering modes have no additional execution overhead at all. However, the software triggering mode has a certain execution overhead since it needs to check whether there is a corresponding patch code at each fixed hook point.

Further, the patch code is loaded (the patch loader). The patch loader is responsible for saving the context after the patch code is triggered, loading the patch code, calling the eBPF VM, and restoring the context after the patch code is executed. In order to more clearly illustrate the interaction between the patch loader module, the vulnerability function, the caller of the vulnerability function and the eBPF VM, the architecture and workflow of the runtime of the present disclosure is shown in FIG. 7. As shown in FIG. 7, the caller of the vulnerability function prepares parameters in advance, and then calls the vulnerability function. At the entrance of the vulnerability function, that is, before the vulnerability function executes the first instruction performs interception, or the execution of the patch code is triggered. An interception mode may be one of the above-mentioned fixed patch code trigger points or the dynamic patch code trigger point. After intercepting the vulnerability function, a control flow is imported into the patch loader. The patch loader will first push and save context information such as a register status when the vulnerability function is called, and then look up the patch list through the entrance address of the vulnerability function to obtain a corresponding eBPF patch code, a patch mode and an execution mode. Next, the patch loader calls the patch executor (eBPF VM) to execute the patch code. The patch executor performs limited operation on the patch code according to different incoming patch modes and execution mode configurations, and the eBPF patch code returns different operation codes and optional additional return addresses to the patch loader according to operation results.

Different from the existing work that chooses to directly kill a process where the vulnerability function is located when malicious input that will trigger the vulnerability is detected, the runtime module in the present disclosure chooses a more refined processing mechanism to prevent the vulnerability from being exploited, and ensure that key tasks of the real-time operating system are not affected at the same time and may continue to be executed. Specifically, there are three subsequent execution routes for the patch loader according to received operation codes: continuing to execute the vulnerability function normally; jumping to the error handling flow in the vulnerability function; and abandoning the execution of the vulnerability function and returning the error code to the caller of the vulnerability function in advance, and the caller will execute the error handling process. The three execution routes correspond to the three operation codes returned by the execution of the patch code, respectively, namely, OP_PASS, OP_REDIRECT and OP_DROP in FIG. 7. The processing mechanism design of the OP_REDIRECT and OP_DROP are derived from analysis of a large number of real-time operating systems or open source third-party library codes. Since a C code function of embedded system usually returns a status code to tell the caller whether the function is executed successfully. In response to determining that the function fails to execute, error information is included in the status code, so it is convenient for the caller to execute different error handling processes. In addition, in response to determining that multiple functions cooperate through global variables, each function usually contains a dedicated code fragment for error handling, records error information in the global variables, facilitates other functions to make decisions, or restores context data. The code fragment may be used flexibly to assist the patch loader in error handling.

It is to be noted that whether it is the code replace patch mode or the filter patch mode, the operation codes returned by the patch code are limited that merely be OP_PASS, OP_REDIRECT and OP_DROP. In order to prevent the patch code from being used maliciously, the runtime module is not allowed to specify any address when redirecting. The address must be one of the return address of the original vulnerability function or an entrance of the basic block in the vulnerability function.

Figure 10:
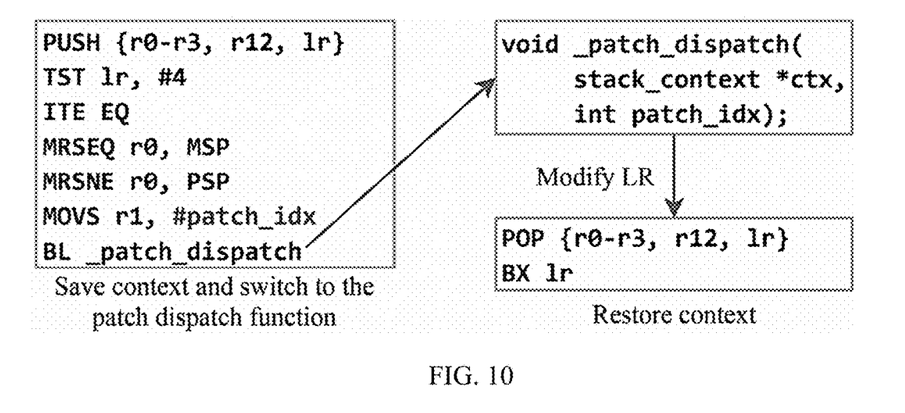
FIG. 10 is a schematic diagram of describing a context switching performed by a patch loader according to an embodiment of the present disclosure.

A context switching operation in an execution process of the patch code that the patch loader is responsible for consists of two parts, that is, storing the context of the original function before executing the patch code, and restoring the context after executing the patch code. As shown in FIG. 10, after the patch code is triggered, the patch loader first pushes the register state of the original function, and then passes a stack pointer to a_patch dispatch function, which will complete the query and execution of the patch code, and then choose whether to change a LR register to change the return address according to the different operation codes returned by the patch code. After that, the patch loader restores the register state of the original function and ends the execution flow of the patch code.

Further, the patch code is executed (the patch executor). The patch executor is a component in the runtime module that is responsible for executing the patch code. The present disclosure not only supports the interpretation execution of the patch code by transplanting the eBPF VM in the Linux kernel, but also separately realizes the eBPF JIT execution on an ARM THUMB instruction set.

The two execution modes adopt different strategies to restrict the patch code in different patch modes. In the patch mode of the filter patch, the interpretation execution carries out a dynamic check when the patch code is running, and a memory compilation operation outside the eBPF stack and excessive number of loops are prohibited. The JIT execution discards the patch code that exist in the memory compilation operation outside the eBPF stack when the patch code is JIT compiled, and implants additional instructions for the patch code with loops to limit the number of loops. In the code replace patch mode, the eBPF VM will still take circular limitation measures for the two execution modes, and the security of memory access and this C function call needs to be guaranteed by the developer's offline testing.

An eBPF map is an important data structure in eBPF VM of Linux system, which helps to realize eBPF data interaction between user space and kernel space. In the present disclosure, the eBPF VM is transplanted and the eBPF map is also transplanted, and an important use of eBPF map in firmware vulnerability patch is found. The applicant noticed that patching a class of vulnerabilities needs to share states between different functions. Taking CVE-2018-16528 in FreeRTOS as an example, the source of its vulnerability is that when a prvSetupConnection function of TCP protocol stack tries to establish a Socket connection, it does not know whether a connection establishment failure is caused by the failure of TLS handshake, that is, whether a TLS context object is ready. In a subsequent connection failure processing flow, the prvSetupConnection function tries to access the TLS context object that may not be ready, and a memory error will occur. In order to patch the vulnerability, the present disclosure records a state of TLS context object by using the eBPF map when establishing a socket connection, which is convenient for different processing in the connection failure processing flow.

To sum up, the present disclosure provides a hotpatch architecture for alleviating firmware vulnerabilities in the embedded IoT devices, which has universality, timeliness, security and flexibility at the same time. The universality is embodied in that the present disclosure uses the operating system and hardware-independent programming language eBPF to compile the patch code. Merely one patch code is compiled through the toolchain module and the runtime module included in the architecture of the present disclosure, so that it may be automatically adapted, compiled and deployed to various real-time operating systems. The patch process also avoids the synchronization and adaptation of the code update of the open source real-time operating system or the third-party software library, and does not need the developer to manually adapt and compile the whole firmware repeatedly, thus accelerating the deployment process of the patch code, and realizing the timeliness of patch. According to the present disclosure, the security of the architecture is improved by applying different patch modes to vulnerabilities of different reasons and types, the patch codes in different patch modes have different execution capabilities, and the execution capabilities are strictly limited by an interpreter or a JIT compiler in eBPF VM. In addition, the toolchain module also includes an offline eBPF verifier which is customized based on the vulnerability patch requirements, which is used to detect behaviors with security risks in the eBPF patch code. As for the flexibility of the patch architecture, the present disclosure simultaneously supports two dynamic patch code trigger points and one static patch code trigger point, and also supports the interpretation execution of the patch code and the JIT compilation execution. Users of the architecture of the present disclosure may flexibly select and combine different trigger modes, execution modes and patch modes according to actual vulnerability patch requirements, operating systems and device conditions, so as to efficiently complete vulnerability patch tasks.

According to the hotpatch method for the vulnerabilities in the embedded IoT devices provided in the embodiment of the present disclosure, firstly, the vulnerability function is intercepted, and the transmission of the verified patch code is completed by means of the encrypted network communication or the secure external interface of the device, and then the execution of the patch code is triggered according to the patch modes and execution modes of different patch codes. The hotpatch method for the vulnerabilities in the embedded IoT devices provided in the present disclosure has remarkable universality, timeliness, security and flexibility, and may provide substantial help to the existing IoT system.

Figure 11:
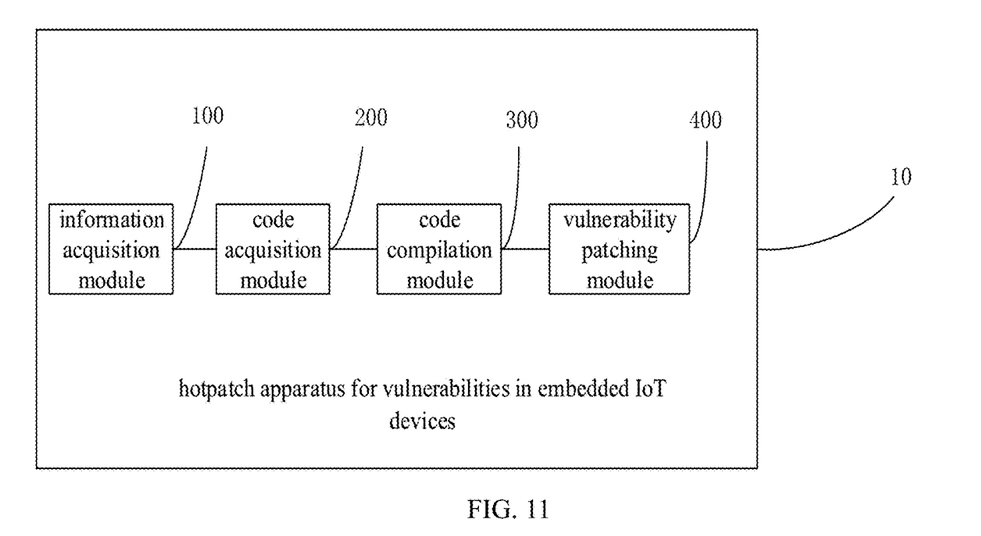
FIG. 11 is a schematic diagram of a hotpatch apparatus for vulnerabilities in embedded IoT devices according to an embodiment of the present disclosure.

In order to realize the above-mentioned embodiments, as shown in FIG. 11, embodiments of the present disclosure also provides a hotpatch apparatus 10 for vulnerabilities in embedded IoT devices. The apparatus 10 includes an information acquisition module 100, a code acquisition module 200, a code compilation module 300 and a vulnerability patching module 400.

The information acquisition module 100 is configured to acquire vulnerability information of the IoT device to be patched.

The code acquisition module 200 is configured to select a corresponding vulnerability patching mode based on different vulnerability types of the vulnerability information, and acquire a first patch code and a first patch code configuration file from a server according to the vulnerability patching mode.

The code compilation module 300 is configured to compile the first patch code based on the first patch code and the first patch code configuration file to generate a second patch code and configuration information of the second patch code.

The vulnerability patching module 400 is configured to execute different instructions on the second patch code to patch the vulnerability information based on the configuration information and the vulnerability patching mode.

Further, the vulnerability patching mode includes a first patch mode including executing a vulnerability function on the first patch code to check whether parameters are legal, and in response to determining that the parameters are legal, exiting the first patch code and continuing to execute the vulnerability function; and a second patch mode including replacing the vulnerability function or a code segment.

Further, the code acquisition module 200 is further configured to compile the first patch code by using the first patch mode, and perform corresponding operation processing according to different operation codes when the first patch code is executed; and compile the first patch code by using the second patch code, replace an original function or a vulnerability code segment, replace a function calling part of an original code with the patch code, and call a local C function to acquire information.

Further, the code compilation module 300 includes a fixed trigger instruction sub-module configured to intercept a flow of the vulnerability function by inserting a stake at an entrance of the vulnerability function, enter a corresponding processing function after the interception is successful, and call and execute the second patch code in the processing function; a dynamic trigger instruction sub-module configured to remap an address after the address in a hardware debugging register is matched, replace an instruction through a REMAP Table, replace a target instruction with a jump instruction, and jump to a corresponding processing function; and not replace an instruction after the address in the hardware debugging register is matched, triggering a hardware exception handling process, process exception data, push a state of a CPU register at a time of interruption, and then execute the second patch code.

Further, the apparatus 10 further includes a code loading module configured to call the vulnerability function when the vulnerability information is detected, intercept the vulnerability information before executing a first instruction, trigger the second patch code, import a generated control flow into a loading module of a patch code, push and save register state information when the vulnerability function is called, and search a patch list through an entry address of the vulnerability function to obtain a corresponding second patch code, the vulnerability patching mode and an execution instruction, and finally execute the second patch code.

According to the hotpatch apparatus for the vulnerabilities in the embedded IoT devices provided in the embodiment of the present disclosure, firstly, the vulnerability function is intercepted, and the transmission of the verified patch code is completed by means of the encrypted network communication or the secure external interface of the device, and then the execution of the patch code is triggered according to the patch modes and execution modes of different patch codes. The hotpatch method for the vulnerabilities in the embedded IoT devices provided in the present disclosure has remarkable universality, timeliness, security and flexibility, and may provide substantial help to the existing IoT system.

The hotpatch method for the vulnerabilities in the embedded IoT devices and the hotpatch apparatus for the vulnerabilities in the embedded IoT devices in the embodiment of the present disclosure aim at the security problems existing in the above-mentioned embedded IoT devices, and make up for the deficiencies of existing vulnerability patch technologies. The firmware vulnerability patching work may be automatically and rapidly completed under the condition that software service is not interrupted or the system is restarted, the method and apparatus are suitable for real-time operating systems of various IoT devices, and the overhead is small.

The present disclosure greatly accelerates a deployment process of the patch code while ensuring the security of the patch code. The compilation of the patch code in the present disclosure does not need to synchronize an update of an open source real-time operating system or a third-party library, merely one eBPF patch code is needed to be compiled for one vulnerability, and then a corresponding binary eBPF patch code may be automatically adapted and compiled for all the firmware with the vulnerability by using a toolchain, without manually adapting the patch code for each device and firmware. The adaptation and compilation of the patch code in the present disclosure is different from the adaptation and compilation of the traditional whole firmware. The adaptation and compilation of the patch code in the present disclosure merely needs a ready-made firmware image to assist a global symbol analysis in the patch code, which may be automatically completed by the toolchain. However, the adaptation and compilation of the traditional whole firmware needs to completely construct a compilation environment of an original firmware, including a compilation configuration and a compilation parameter selection, and a large amount of code synchronization is likely to lead to frequent errors in the compilation process, which needs manual adjustment one by one.

The vulnerability patch solution provided in the present disclosure is independent of the operating system. When a new vulnerability is disclosed, regardless of whether the vulnerability comes from a system developed by a manufacturer of the embedded IoT devices, the open source real-time operating system, or an open source third-party library, as long as a device manufacturer may acquire vulnerability details and vulnerability codes, a hotpatch architecture provided in the present disclosure may be applied to carry out the hotpatch of the vulnerabilities in time.

Reference throughout this specification to terms "an embodiment", "some embodiments", "an example", "a specific example", or "some examples" mean that a particular feature, structure, material, or characteristic described in connection with the embodiment or example is included in at least one embodiment or example of the present disclosure. The schematic expressions of the above-mentioned terms throughout this specification are not necessarily referring to the same embodiment or example. Moreover, the particular features, structures, materials, or characteristics described may be combined in any suitable manner in one or more embodiments or examples. In addition, those skilled in the art can combine the different embodiments or examples and features of different embodiments or examples described in this specification without being mutually inconsistent.

In addition, terms "first" and "second" are used herein for purposes of description and are not intended to indicate or imply relative importance or significance or to imply the number of indicated technical features. Thus, the feature defined with "first" and "second" may explicitly or implicitly include at least one of these features. In the description of the present disclosure, "a plurality of" means at least two, such as two, three, etc., unless specified otherwise.

What is claimed is:

1. A hotpatch method for vulnerabilities in embedded Internet of Things (IoT) devices, comprising:

acquiring vulnerability information of the embedded IoT devices to be patched;

selecting a corresponding vulnerability patching mode based on different vulnerability types of the vulnerability information, and acquiring a first patch code and a first patch code configuration file from a server according to the vulnerability patching mode;

compiling the first patch code based on the first patch code and the first patch code configuration file to generate a second patch code and configuration information of the second patch code; and executing different instructions on the second patch code to patch the vulnerability information based on the configuration information and the vulnerability patching mode;

wherein the vulnerability patching mode comprises:

a first patch mode comprising executing a vulnerability function on the first patch code to check whether parameters are legal, and in response to determining that the parameters are legal, exiting the first patch code and continuing to execute the vulnerability function; and a second patch mode comprising replacing the vulnerability function or a code segment;

wherein acquiring the first patch code and the first patch code configuration file from the server based on different vulnerability patching modes comprises:

compiling the first patch code by using the first patch mode, and performing corresponding operation processing according to different operation codes when the first patch code is executed; and compiling the first patch code by using the second patch mode, replacing an original function or a vulnerability code segment, replacing a function calling part of an original code with the patch code, and calling a local C function to acquire information;

wherein the different instructions comprise:

a fixed patch code trigger instruction: intercepting a flow of the vulnerability function by inserting a stake at an entrance of the vulnerability function, entering a corresponding processing function after the interception is successful, and calling and executing the second patch code in the processing function;

a dynamic trigger instruction: remapping an address after the address in a hardware debugging register is matched, replacing an instruction through a REMAP Table, replacing a target instruction with a jump instruction, and jumping to a corresponding processing function; and not replacing an instruction after the address in the hardware debugging register is matched, triggering a hardware exception handling process, processing exception data, pushing a state of a CPU register at a time of interruption, and then executing the second patch code.

2. The method of claim 1, further comprising:

calling the vulnerability function when the vulnerability information is detected;

intercepting the vulnerability information before executing a first instruction;

triggering the second patch code;

importing a generated control flow into a loading module of a patch code;

pushing and saving register state information when the vulnerability function is called; and searching a patch list through an entry address of the vulnerability function to obtain a corresponding second patch code, the vulnerability patching mode and an execution instruction, and finally executing the second patch code.

* * * * *